(No Model.)
I. H. RANDALL.
Brake Reel Attachment for Cars.
No. 241,238. Patented May 10, 1881.
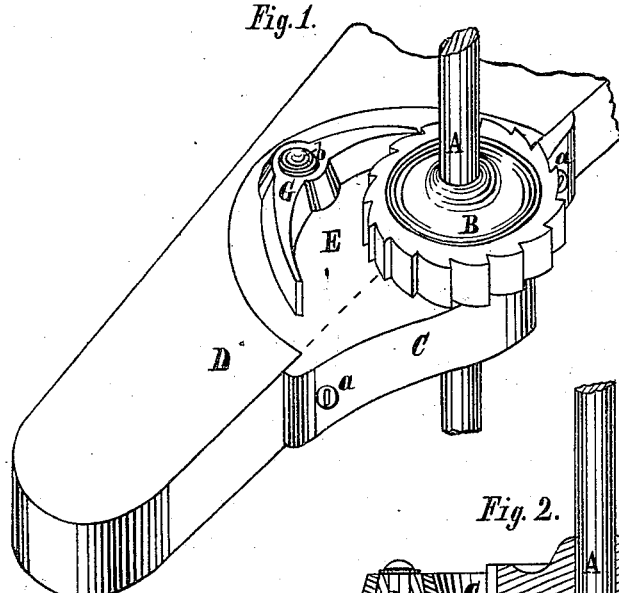
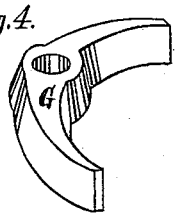
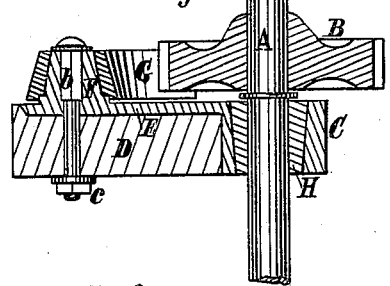
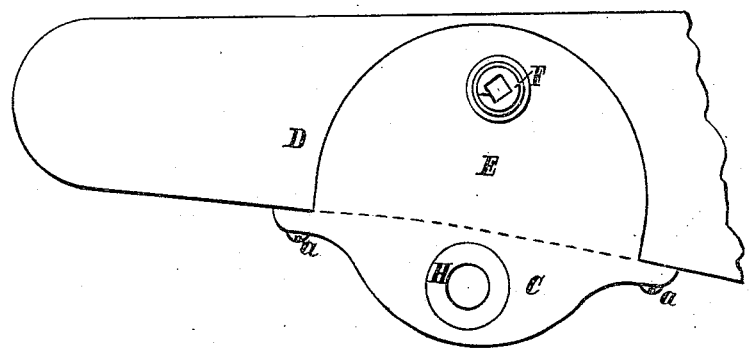
Attest;
Joseph Selig.
Louis Cohen.
Inventor;
Isaac H. Randall,
per Edw. Dummer,
Atty.

UNITED STATES PATENT OFFICE.

ISAAC H. RANDALL, OF BOSTON, MASSACHUSETTS.

BRAKE-REEL ATTACHMENT FOR CARS.

SPECIFICATION forming part of Letters Patent No. 241,238, dated May 10, 1881.

Application filed January 24, 1881. (No model.)

*To all whom it may concern:*

Be it known that I, ISAAC H. RANDALL, a citizen of the United States, residing at Boston, in the county of Suffolk and State of Massachusetts, have invented a new and useful Improvement in Brake-Reel Attachments for Street and other Railway Cars, of which the following is a specification, reference being had to the accompanying drawings.

My invention relates to the brake-reel attachment for street and other railway cars, particularly to the construction and arrangement of the bearing for the reel-shaft and the connection of the dog or pawl therewith; and it consists in a plate cast or formed as one piece with, or rigidly attached to, the reel-block, in which is the bearing for the reel-shaft, having a stud as a pivot for the dog or pawl cast or formed thereon as one piece with said plate, the purpose being to obtain a simple, secure, and durable connection, to keep the dog or pawl in proper relation to the ratchet-wheel. My invention also consists in such further details as are hereinafter described, and specifically pointed out in the claims.

In the drawings, Figure 1 is a perspective view of so much of a brake-reel attachment embodying my invention as serves for illustration of the same. Fig. 2 is a vertical transverse section. Fig. 3 is a plan of the reel-block and plate. Fig. 4 shows the dog or pawl, and Fig. 5 the bushing.

The reel-shaft A is such as is ordinarily used, having the reel at its lower end, the hand-wheel at its upper end, and the ratchet-wheel B just above the reel-block C. The shaft A is represented as broken off above and below the reel-block, and hence the reel and hand-wheel are not shown. The shaft A has a bearing in the reel-block C, which block is fastened to the sill D, in the usual manner, by means of the screws *a a*.

To the reel-block C, I join the plate or extension E, which extends over or is set in the sill D a sufficient distance to hold the stud F, which forms the pivot for the dog or pawl G.

It has heretofore been customary to fasten the reel-block to the sill in the position relative thereto shown in the drawings, but not to have the extension or plate E connected with the reel-block, and hence to have the stud or bolt for the pivot of the pawl fastened directly to the sill. With this arrangement this stud or bolt is apt to become loose and wear the wooden sill, so that the pawl will get out of proper working position in reference to the ratchet-wheel. By joining the stud F firmly to the plate E, which is attached rigidly to the block C, I am able to keep the pawl securely in proper relation to the ratchet-wheel.

The plate E might be formed as a separate piece from the block C, and the stud F as a separate piece from the plate E, the three pieces being suitably and firmly fastened together by screws or bolts or other fastenings; but I prefer, as the most economic way, to cast all these three parts together in one metallic piece, as shown. The pawl G is held on the stud F by means of the bolt *b* and nut *c*. The stud F is preferably made tapering, as shown.

I insert a bushing, H, in the reel-block C, for the bearing for the shaft A. This bushing I prefer to have tapering, as shown, whereby it is readily inserted in the block and securely held therein, though a straight bushing might be employed and otherwise held in the block. By employing the bushing I am able to have the bearing for the shaft of better material than is required for the other part of the block, and when it is worn can readily remove it and substitute a new one. Both of these means contribute to keep the shaft in a close-fitting bearing, and hence to keep the ratchet-wheel and pawl in suitable relative position with the least delay and expense.

I claim as my invention—

1. In a brake-reel attachment, a reel-block having joined thereto an extension or plate, on which is cast or formed, as one piece therewith, a stud, which serves as a pivot for the dog or pawl, substantially as set forth.

2. In a brake-reel attachment, a taper stud rigidly connected to an extension or plate joined to the reel-block, substantially as described.

3. The combination of the reel-block C, having a bushing therein for the reel-shaft, with an extension or plate, E, joined thereto, on which is formed, as one piece therewith, a stud or pivot for the pawl, substantially as specified.

4. In a brake-reel attachment, a reel-block, C, an extension or plate, E, and a pivot, F, cast or formed in one metallic piece, substantially as set forth.

ISAAC H. RANDALL.

Witnesses:
JOHN H. REARDON,
JOHN E. DORLE.